F. H. D. NEWHARD.
RESILIENT WHEEL.
APPLICATION FILED FEB. 23, 1917.
1,274,311.
Patented July 30, 1918.
2 SHEETS—SHEET 1.
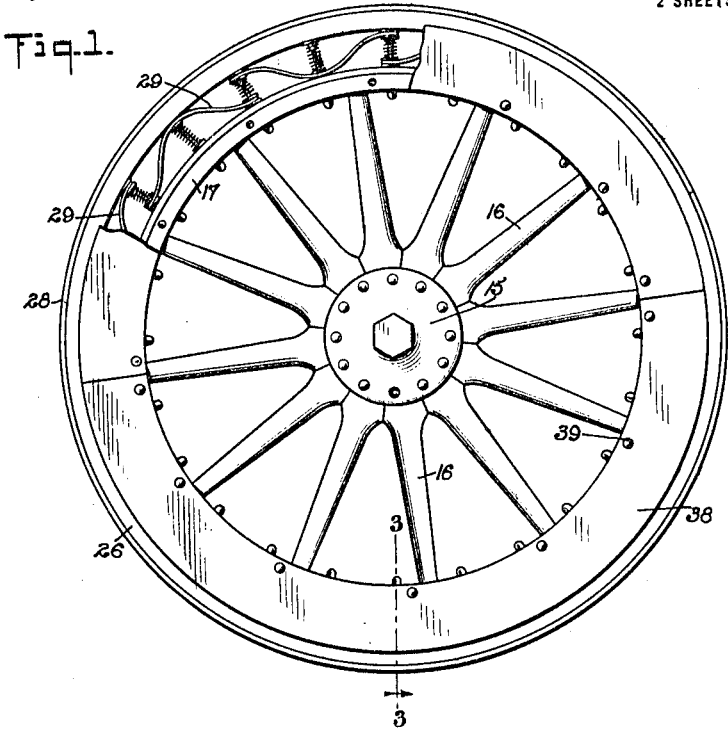
Fig.1.
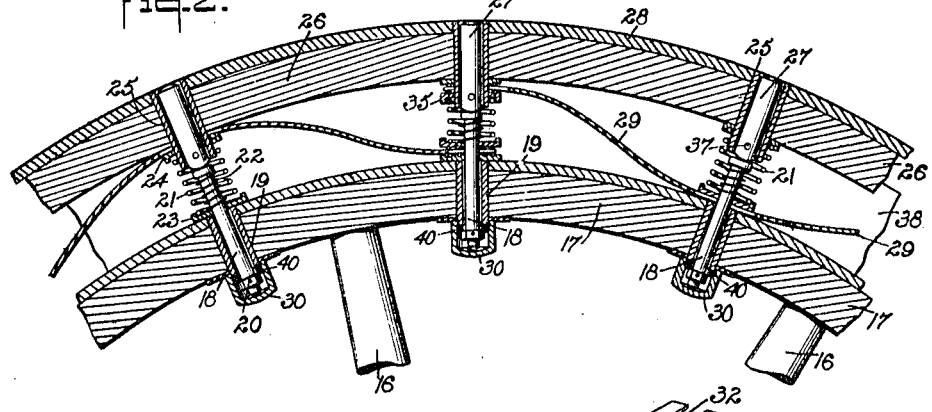
Fig.2.
Fig.3.
WITNESSES
INVENTOR
F. H. D. Newhard
BY
ATTORNEYS

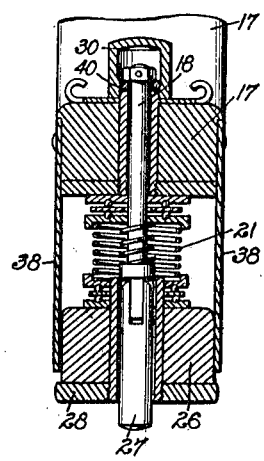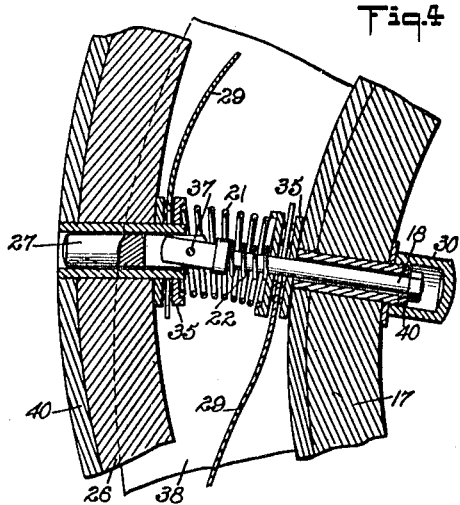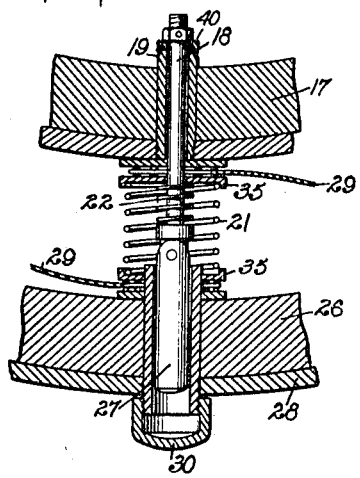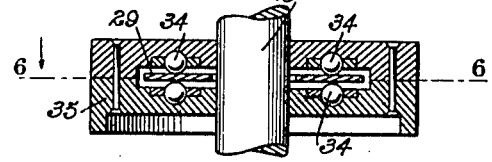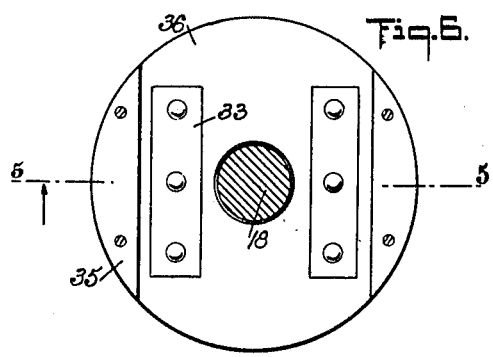

UNITED STATES PATENT OFFICE.

FRANKLIN H. D. NEWHARD, OF CATASAUQUA, PENNSYLVANIA.

RESILIENT WHEEL.

1,274,311.  Specification of Letters Patent.  Patented July 30, 1918.

Application filed February 23, 1917. Serial No. 150,407.

*To all whom it may concern:*

Be it known that I, FRANKLIN H. D. NEWHARD, a citizen of the United States, and a resident of Catasauqua, in the county of Lehigh and State of Pennsylvania, have invented a new and Improved Resilient Wheel, of which the following is a full, clear, and exact description.

Among the principal objects which the present invention has in view are: to provide a cushioning rim for carrying wheels arranged to withstand the wearing abrasion of the usual traffic; to provide means for preventing skidding or side slipping of wheels; and to provide devices for accomplishing the above stated purposes, said devices being extended from the section of the wheel adjacent that in direct contact with the ground.

Drawings.

Figure 1 is a side view of a wheel constructed and arranged in accordance with the present invention, a part of the covering section of said wheel being cut away to show the construction of parts usually concealed thereby;

Fig. 2 is a detail view on an enlarged scale showing in section a fragment of the wheel;

Fig. 3 is a detail view on an enlarged scale of a rim of a wheel constructed and arranged in accordance with the present invention, the section being taken as on the line 3—3 in Fig. 1, the plunger being shown as pressed outwardly beyond the outer rim of the wheel;

Fig. 4 is a detail view on an enlarged scale showing a fragment of the rim and the parts connected therewith as in active service;

Fig. 5 is a cross section of one of the bearings for the ends of certain carrying springs with which the present invention is provided, the section being taken as on the line 5—5 in Fig. 6;

Fig. 6 is a cross section taken as on the line 6—6 in Fig. 5;

Fig. 7 is a perspective view of one of the carrying springs with which the present wheel is equipped;

Fig. 8 is a detail view on an enlarged scale showing one of the covering caps disposed to prevent skidding or side shift of the wheels.

Description.

As seen in the drawings, a wheel constructed and arranged in accordance with the present invention has a hub 15 from which radiates a series of spokes 16. The spokes 16 are permanently provided with an inner rim 17. The inner rim 17 is pierced at suitable intervals to provide openings for mounting plungers 18.

The plungers 18 are suitably housed in bushings 19, which are set in the perforations provided in the inner rim 17. The inner ends of the bushings 18 serve as rests for the adjusting nuts 20 with which each of the plungers 17 is equipped. The nuts 20 are normally held in engagement with the ends of the bushings 19 by the springs 21 and 22. Both springs 21 and 22 are seated at their inner ends in the cups 23 and 24.

The cups 24 surround the bushings 25 with which a tire rim 26 is equipped. The bushings 25 are open at both ends and provide guideways for plungers 27. The plungers 27 operate as anti-skidding members, and to this end are pressed outward beyond the tire 28 by the action of the springs 22 whenever the springs 21 and the carrying wheels 29 are compressed by the weight supported on the wheels.

The movement of the plungers 18 and 27 is limited by a series of caps 30. The caps 30 are rigidly mounted on the bushings 19, being attached thereto by screw-threads on the ends of said sleeves and said caps. This arrangement permits a cushioning of the blow which otherwise would be imparted by the plungers 18 on the caps 30. In service, the weight on the wheel is carried by the springs 29 and 21. These springs are compressed or contracted by said weight when the part of the tire to which any particular set of springs is attached is in contact with the ground.

As shown best in Fig. 7 of the drawings, the springs 29 are provided with an elongated central perforation 31 and open-ended elongated recesses 32 at the ends of said springs.

The grooves thus arranged provide for the necessary longitudinal movement of the said springs.

As seen best in Fig. 2 of the drawings, the springs 29 are alternately reversed, the ends of adjacent springs overlapping in contact with the plungers 18 and bushings 25.

As seen best in Figs. 5 and 6 of the drawings, the movement of the ends of the springs is accommodated by the ball-races 33 and bearing balls 34 exposed therein. The ends of each of the springs 21 are seated in cups 35, which cups as shown best in Fig. 5 of the drawings, contain the races 33 and balls 34. As shown in Fig. 6, a longitudinal groove 36 is formed between the two halves of each cup 35 to form chambers for housing the ends of the springs 29.

The plungers 18 and 27 are pivotally connected, using for this purpose the pins 37. The pivotal connection between the two plungers forms an articulated structure which admits of the movement eccentrically of the rims 17 and 26. This movement is shown best in Fig. 4 of the drawings. The rim 26 is guided in its movement relative to the rim 17 by the side plates 38, which plates are rigidly secured to the rim 17 by bolts 39.

As shown best in Fig. 8 of the drawings, provision may be made for transferring the caps 30 to the perimeter of the wheel and of the rim 26. To accomplish this the bushings 25 are slightly elongated and threaded to fit the threads tapped in the caps 30. When thus equipped it will be observed that the plungers 27 are permitted a limited movement in the said bushings 25, but are prevented from passing therefrom into contact with the adjacent ground.

It is obvious that a wheel when equipped in the manner above described and as shown in the accompanying drawings, will not be collapsed by the side thrust incident to the lateral pressure on the rim of the wheel when the same is running in a curved path. This is prevented primarily by the plates 38 which hold the rim 26 in alinement with the rim 17.

When the rim 26 is equipped with an iron tire 28, it is obvious that all accidents or impediments to the use of the wheel in traffic due to punctures or wear, are overcome.

In practice it is found expedient to provide a series of cushion washers 40, which are interposed between the bushings 19 and the nuts 20 on the plungers 18. The shock of the outward thrust of the springs 21 is thus absorbed and the consequent damage to the nuts 20 and the related structure is avoided. It will be understood that the nuts 20 are held in service relation by lock pins or other suitable well-known devices.

While the plates 38 are used in a manner as above described for preventing the collapse of the wheel incident to the side thrust thereon, this resistance is in a large measure augmented by the fact that the plungers 18 are in action depressed within the bushings 25 and the yield of the plungers to said side thrust is avoided.

*Claims.*

1. A wheel as characterized comprising a central member having a rigid rim; a second rigid rim disposed in annular spaced relation to said first-mentioned rim; cushion means operatively connecting said rims for normally maintaining the spaced relation thereof, said means embodying a plurality of leaf springs disposed between said rims to normally maintain the spaced relation thereof, said springs being alternately reversed and the ends of the adjacent springs overlapping, and a plurality of guiding members operatively engaging said rims to prevent relative rotary movement thereof, said members embodying a plurality of articulated plungers, said plungers being reciprocatively mounted in said rims; a plurality of spiral springs disposed between said rims in guided relation to said plungers, said spiral springs operating to normally maintain the spaced relation of said rims; and means for projecting said plungers beyond the perimeter of the outermost of said rims for preventing skidding of said wheel.

2. A wheel as characterized comprising a central member having a rigid rim; a second rigid rim disposed in annular spaced relation to said first-mentioned rim; cushion means operatively connecting said rims for normally maintaining the spaced relation thereof, said means embodying a plurality of leaf springs disposed between said rims to normally maintain the spaced relation thereof, said springs being alternately reversed and the ends of the adjacent springs overlapping, and a plurality of guiding members operatively engaging said rims to prevent relative rotary movement thereof, said members embodying a plurality of articulated plungers, said plungers being reciprocatively mounted in said rims; a plurality of helical springs disposed between said rims in guided relation to said plungers, said spiral springs operating to normally maintain the spaced relation of said rims; means for projecting said plungers beyond the perimeter of the outermost of said rims for preventing skidding of said wheel; and yielding means for normally maintaining said plungers in retracted relation to said outermost rim.

FRANKLIN H. D. NEWHARD.